United States Patent [19]
Ylä-Outinen et al.

[11] Patent Number: 6,167,256
[45] Date of Patent: Dec. 26, 2000

[54] ARRANGEMENT FOR CALL FORWARDING IN A MOBILE SERVICES SWITCHING CENTER

[75] Inventors: Petteri Ylä-Outinen, Helsinki; Matti Keskinen, Järvenpää, both of Finland

[73] Assignee: Nokia Telecommunications OY, Espoo, Finland

[21] Appl. No.: 08/875,463

[22] PCT Filed: Dec. 21, 1995

[86] PCT No.: PCT/FI95/00704

§ 371 Date: Jun. 20, 1997

§ 102(e) Date: Jun. 20, 1997

[87] PCT Pub. No.: WO96/20554

PCT Pub. Date: Jul. 4, 1996

[30] Foreign Application Priority Data

Dec. 23, 1994 [FI] Finland .................................. 946090

[51] Int. Cl.[7] .................................................. H04M 3/42
[52] U.S. Cl. ........................................ 455/417; 379/211
[58] Field of Search ................................. 455/412, 413, 455/414, 417, 432, 433, 435, 445; 379/210, 211, 212

[56] References Cited

U.S. PATENT DOCUMENTS

| | | | |
|---|---|---|---|
| 5,278,890 | 1/1994 | Beeson, Jr. et al. | 455/433 |
| 5,329,578 | 7/1994 | Brennan et al. | 455/461 |
| 5,548,636 | 8/1996 | Bannister et al. | 379/210 |
| 5,579,375 | 11/1996 | Ginter | 455/417 |

FOREIGN PATENT DOCUMENTS 350 918   1/1990   European Pat. Off. .
92/22174  12/1992  WIPO .

OTHER PUBLICATIONS

Patent Abstract of Japan, vol. 10, No. 133, E-404, Dec. 27, 1985JP,A 60-264151.

*Primary Examiner*—Reinhard J. Eisenzopf
*Assistant Examiner*—Sam Bhattacharya
*Attorney, Agent, or Firm*—Pillsbury Madison & Sutro Intellectual Property

[57] ABSTRACT

A mobile services switching center for forwarding a subscriber directory number terminating call to a call forwarding number which is retrieved from a separate subscriber database. The mobile services switching center contains a call forwarding database which stores directory numbers of forwarding parties from each of which a set-up of a forwarded call is in progress. The call control of the mobile services switching center is arranged to check, prior to initiating call forwarding, whether a directory number of the forwarding party is included in the call forwarding database. The call control of the mobile services switching center is further arranged to release the call in response to the directory number of the forwarding party being included in the call forwarding database, in order to avoid looping of the call due to the call forwarding, and, in response to the directory number of the forwarding party not being included in the call forwarding database, to insert the directory number of the forwarding party in the call forwarding database, and to continue the call forwarding.

8 Claims, 3 Drawing Sheets

ARRANGEMENT FOR CALL FORWARDING IN A MOBILE SERVICES SWITCHING CENTER

This application is the national phase of international application PCT/FI95/00704 filed Dec. 21, 1995 which designated the U.S.

FIELD OF THE INVENTION

The present invention relates to an arrangement in a mobile services switching center for forwarding a subscriber directory number terminating call to a call forwarding number retrieved from a separate subscriber database.

BACKGROUND OF THE INVENTION

One of the supplementary services of modern mobile communication systems is call forwarding which can be activated by a mobile subscriber. It is possible for the subscriber to determine various kinds of call forwarding functions. In an unconditional call forwarding, a mobile terminating call is always forwarded to a given call forwarding number. In a conditional call forwarding, a mobile terminating call is forwarded upon fulfilment of a specific condition; for example, when the subscriber is busy, when the mobile station cannot be reached, or when it is possible to establish a connection to the mobile station but the subscriber does not respond within a preset period of time.

In the most recent mobile communication systems, the subscriber data are stored in a subscriber register separate from the mobile services switching center. For example, in the pan-European digital mobile communication system GSM (Global System for Mobile Communications), the subscriber data are maintained in a network element separate from the mobile services switching center MSC, i.e. in a home location register HLR, and in a visitor location register VLR located at the switching center MSC but operationally separate from it. Information on the call forwarding is obtained, depending on the phase of the call, from either one of the registers as a result of a database enquiry by the mobile services switching center. Neither of the registers VLR or HLR, however, contain information on the phase of the forwarding call which is being established. Consequently, the register provides the mobile services switching center with a forwarding number even if the mobile services switching center already had another call forwarding call of the same subscriber in a set-up phase. The aforementioned leads to a situation where a mobile subscriber and another mobile subscriber or a subscriber of a public switched telephone network PSTN, (e.g. the same person from his work place telephone connected to the PSTN), place a call forwarding to each other, resulting in a third person who calls the same subscriber number or work place number creating an endless call forwarding, if the telephone network between the forwarding subscribers does not support transfer of the call forwarding information. The "endless call forwarding" finally results in all the trunk circuits between the switching centers being reserved for this one call until there is no free trunk circuit, whereby all the circuits reserved for the call are released. Both the unconditional and conditional call forwardings cause problems between a mobile subscriber and a PSTN subscriber, as well as between two mobile subscribers in different networks. Between mobile subscribers within the same network but in service areas of different switching centers, problems occur in connection with conditional call forwardings.

DISCLOSURE OF THE INVENTION

It is an object of the present invention to avoid endless call forwarding in mobile communication systems.

This is achieved by an arrangement set forth in the introduction, which according to the invention is characterized in that the mobile services switching center comprises a call forwarding database which stores a directory number of a forwarding party from which a set-up of a forwarded call is in progress, the call control of the mobile services switching center is arranged to check, prior to initiating call forwarding, whether the directory number of the forwarding party is included in the call forwarding database, the call control of the mobile services switching center is arranged to release the call in response to the directory number of the forwarding party being included in the call forwarding database, the call control of the mobile services switching center is arranged, in response to the directory number of the forwarding party not being included in the call forwarding database, to insert the directory number of the forwarding party in the call forwarding database, and to continue the call forwarding.

In the present invention, the mobile services switching center comprises a call forwarding database which stores the directory numbers of the forwarding mobile subscribers during the set-up phase of the call forwarding call. The call control of the mobile services switching center employs the call forwarding database in association with call forwarding calls. The call control inserts the directory number in the call forwarding database when a call forwarding is for the first time made from this directory number. As the mobile services switching center, during normal signalling between the switching centers, obtains information on the fact that call set-up has been discontinued or interrupted, the mobile services switching center deletes the directory number from the call forwarding database. Upon receiving a command from the subscriber database to perform a call forwarding, the call control each time checks whether the forwarding directory number is included in the database, i.e. whether it already has a call forwarding call in a set-up phase. Consequently, if the same call during the call set-up phase returns to the mobile services switching center along any route, the call control detects by a check into the call forwarding database that there is already a call forwarding to a mobile subscriber being established, and that the new call may be released. When the call control inserts the new directory number in the call forwarding database, it also activates a precautionary time-out by means of which the filling up of the database can be avoided in case the call control during malfunction does not receive information on the discontinuing of the call establishment and/or does not delete the directory number from the database. If the precautionary time-out expires, the call control deletes the directory number from the database even if the call set-up had not ended. Due to the fact that the number of the forwarding mobile subscriber is in the database during the call set-up only, the database need not include records for all the subscribers within the MSC service area. This allows to keep the database relatively small.

The present invention makes it possible to prevent the developing of an endless call forwarding loop by internal changes in the mobile services switching center without any need for deviations from specifications determined for each mobile communication system, regarding, e.g. external signalling. If an attempt were made to store the data on whether a call set-up is currently in progress or not, for example, in subscriber databases, it would require that the forwarding mobile services switching center would have to send information on the progress of the call set-up, and particularly on its ceasing, to the subscriber database to enable deletion from the database of information on the call forwarding call. The aforementioned alternative embodiment would, according to the GSM recommendations, be impossible to apply to a subscriber database of the GSM system, for example, because upon ceasing of the call set-up there are no operations by means of which the information on the forwarded call could be deleted in the subscriber register. Thus, the solution implemented in the subscriber database would require deviations from the signalling and operation according to the recommendations whereas the present invention can be implemented in present-day mobile services switching centers with no need to change the operation of the network or other network components.

BRIEF DESCRIPTION OF THE DRAWINGS

In the following, the invention will be described in closer detail by means of the preferred embodiments with reference to the accompanying drawings, in which.

THE PREFERRED EMBODIMENTS OF THE INVENTION

The present invention can be applied to mobile communication systems which employ a call forwarding service and which store subscriber information in subscriber databases that are operationally separate from the mobile services switching center, and in which signalling between switching centers does not transfer information on whether the call that is being set-up is a forwarded call, or transfers this information inadequately. The present invention is particularly well suited to preventing an endless call forwarding loop in the pan-European digital mobile communication system GSM (Global System for Mobile Communications), and in other similar mobile communication systems, such as DCS1800 (Digital Communication System) and PCN (Personal communication System) and in systems according to the EIA/TIA INTERIM standard. In the following, the preferred embodiment of the invention will be described as applied to the GSM system without, however, restricting the invention thereto.

Figure 1:
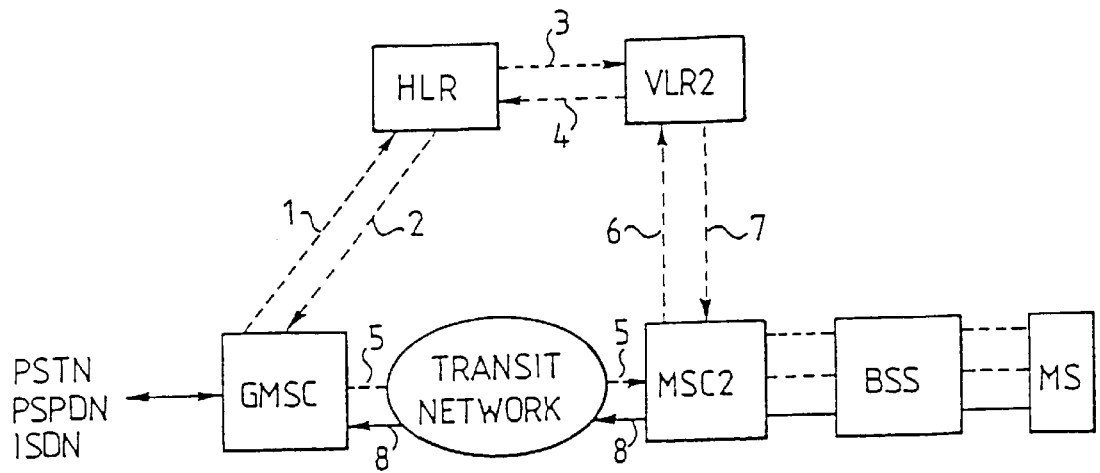
FIG. 1 is a block and signalling diagram illustrating the set-up of a mobile terminating call in the GSM mobile communication system.

FIG. 1 very briefly illustrates the basic elements of the GSM system without going any further into their characteristics or other sub-areas of the system. For a closer description of the GSM system, the GSM recommendations and "The GSM System for Mobile Communications", M. Mouly & M. Pautet, Palaiseau, France, 1992, ISBN: 2-9507190-0-7 are referred to.

The mobile services switching centre MSC handles the connecting of incoming and outgoing calls. It carries out functions similar to those of an exchange of a public switched telephone network (PSTN). In addition to these, it also carries out functions characteristic of mobile communications only, such as subscriber location management in co-operation with the subscriber registers of the network. As subscriber registers, the GSM system includes the home location register HLR and the visitor location register VLR. The HLR permanently stores the subscriber information as well as information on which VLR area the MS is located in. The visitor location register VLR, in turn, temporarily stores the subscriber information of the mobile station MS during the time the mobile station is located in the area of the mobile services switching center MSC connected to the visitor location register VLR. One VLR typically serves one mobile services switching center MSC. The mobile stations MS are connected to the switching center MSC by base station systems BSS. The base station system BSS consists of a base station controller BSC and base stations BTS. One base station controller BSC is used to control several base stations BTS.

As noted above, various call forwarding functions may be determined by the mobile subscribers. The information on the call forwarding functions activated by the subscriber are permanently stored in the subscriber home location register HLR. In addition, the information on the activated conditional call forwardings, at least, is also supplied to the visitor location register VLR serving the subscriber, and stored therein.

To facilitate understanding of the present invention, the following describes establishing of a mobile station MS terminating call in the GSM system, with reference to FIG. 1. It is assumed that a call from a public switched telephone network PSTN is received at a gateway mobile services switching center GMSC of the mobile communication network. The GMSC carries out a routing information interrogation 1 to the HLR, which is determined by the subscriber number MSISDN of the subscriber. Within the routing information interrogation 1, the MSISDN number of the subscriber is also sent. During location updating, the HLR is updated with information on which visitor location register VLR area the mobile subscriber is located in. The HLR checks whether the called subscriber has an unconditional call forwarding, or whether the subscriber is detached from the network and whether the subscriber has an active call forwarding for such a situation. If that is the case, the HLR supplies the GMSC with information on an active call forwarding and a call forwarding number in a response message 2. Following this, the GMSC routes the call on the basis of the call forwarding number.

If the HLR notices that no active call forwarding exists, it carries out a roaming number request 3 to the VLR2. At the location updating, the HLR has been updated with information on which of the VLR areas the subscriber is located in. The VLR2 allocates a roaming number MSRN and transmits it to the HLR in a response message 4. The HLR, in turn, transmits the roaming number forward in the message 2 to the interrogating GMSC. The roaming number space has been so determined that the call is always directed to that center MSC whose visitor location register VLR2 has allocated the roaming number. Therefore, the GMSC is able to route the call by transmitting an initial address message 5 to the MSC2 indicated by the roaming number.

Upon receiving the initial address message 5, the MSC2 notices in the roaming number analysis that the call will terminate at the service area of the same MSC, and it is not intended to be forwarded. The MSC2 then requests in message 6 information for call set-up from the VLR2. Normally, the visitor location register VLR2 returns the information required in a response message 7, and the call will be set up to the mobile station MS through the base station system BSS. If the subscriber is busy, or located in a shadowed area or does not respond to the call, the MSC2 detects the state of the subscriber and informs the VLR2, whereby the VLR2 checks whether a call forwarding is active. If there is a call forwarding in an active state, the VLR2 returns the call forwarding number to the MSC2. The MSC2 then routes the call forward on the basis of the call forwarding number (8).

In a mobile system such as the one described above, the mobile services switching centers GMSC and MSC2 do not have any information on whether a mobile subscriber already has a previous forwarded call in set-up phase. The initial address messages 5 forwarded by one center to the other do not contain this information, either. Thus, it is possible that an endless call forwarding loop will be developed as described above.

Figure 2:
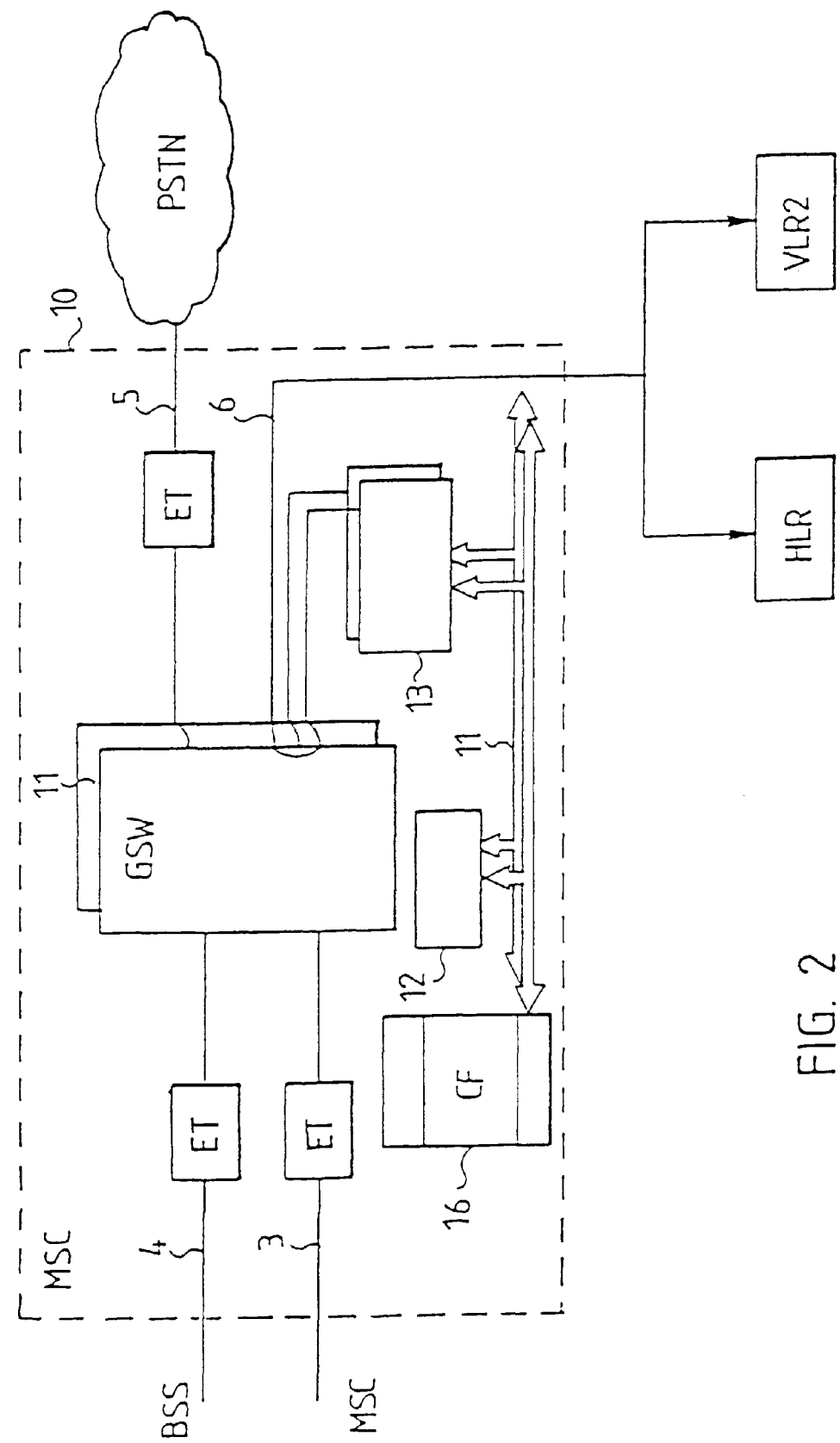
FIG. 2 shows a block diagram of a mobile services switching center according to the invention.

FIG. 2 illustrates a block diagram of a mobile services switching center MSC according to the invention, capable of preventing the development of an endless call forwarding loop. For reasons of clarity, only a switching matrix 11 and the call control of the MSC are shown in FIG. 2. The call control in the embodiment shown is a distributed computer system comprising computers 13 and a message bus interconnecting them. In practice, the MSC may include a large number of various kinds of devices and functions that are not, however, essential as far as the present invention is concerned. Trunk circuits 5 are coupled to the switching matrix to the PSTN (in the GMSC), trunk circuits 3 to other MSCs, trunk circuits 4 (to the base station systems BSS), and signalling lines 6 to the subscriber databases HLR and VLR2 and possibly to other network elements. As an example of such a switching exchange, the Nokia Telecommunications DX200 MSC is mentioned.

Figure 3:
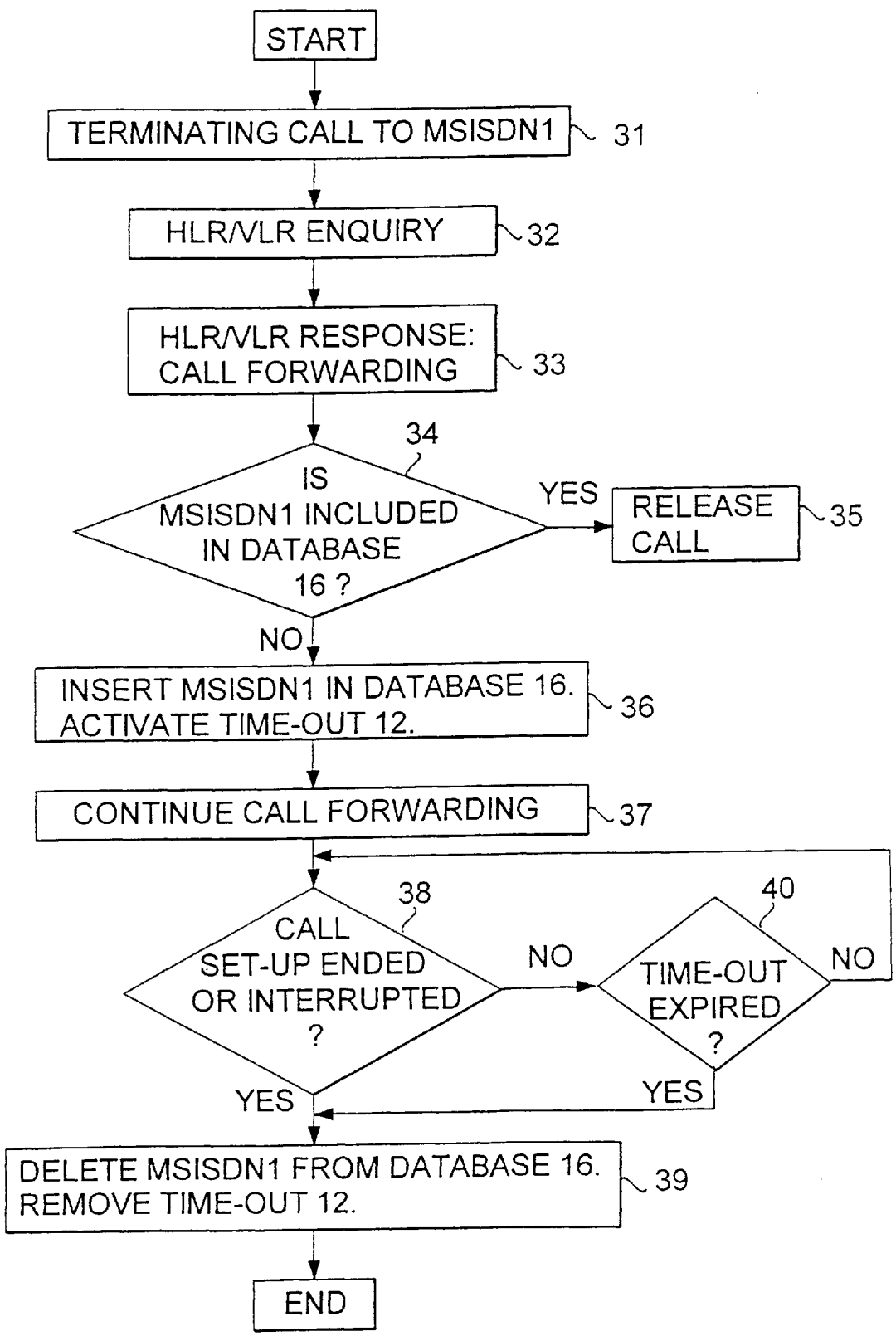
FIG. 3 is a flow chart illustrating the operation of the mobile services switching center according to the invention.

The MSC according to the invention furthermore comprises a call forwarding database CF 16, which stores the MSISDN numbers of the forwarding mobile subscribers during the call set-up phase. The database 16 is connected to the call control 13 through an internal bus 11. As the MSISDN number of the forwarding subscriber is stored in the database 16 for the time period of the call set-up only, the database 16 need not have records for all the mobile subscribers within the service area of the MSC. The call control 13 directs three types of operations to the database 16. In the following, these operations are described with reference to FIG. 3:

check_MSISDN. This operation is employed by the call control in all the situations in which set-up of a call forwarding call is to be initiated. In FIG. 3, for example, the call control 13 receives a terminating call with the directory number MSISDN1 (step 31), and, depending on the case (cf. FIG. 1), carries out an interrogation either to the HLR or the VLR (step 32). The HLR, or the VLR, responds by informing of the call forwarding to a specific call forwarding number (step 33). In such a case, the check_MSISDN operation checks (step 34) whether the MSISDN1 is already included in the call forwarding database 16, and returns the response to the call control 13. If the MSISDN1 is contained in the database 16, the call control 13 releases the call (step 35). If the MSISDN1 is not included in the database 16, the call control continues the call set-up.

insert_MSISDN. This operation is employed by the call control 13 if the check_MSISDN operation (step 34) has responded with such an information that the MSISDN1 is not included in the database 16. The operation (step 36) inserts MSISDN1 in the database 16, and activates a precautionary time-out in a timer 12 for a record reserved for the MSISDN. Following this, the call control 13 continues the call forwarding normally (step 37).

delete_MSISDN. This operation is employed by the call control 13 when the call set-up terminates, i.e. when the called subscriber answers, or when the call set-up is interrupted for any other reason (step 38). The operation releases the record from a database 16 by deleting the MSISDN1 (step 39). In the same context, the precautionary time-out of the record in timer 12 is deactivated.

If the result of step 38 is negative, a check is performed on whether the time-out 12 has expired (step 40). Upon expiration of the precautionary time-out, the MSISDN1 included in the record is deleted from the database (step 39). The precautionary time-out is required to protect the database 16 from filling up in case the call control 13 during malfunction does not delete the directory number MSISDN1 from the database 16.

Figure 4:
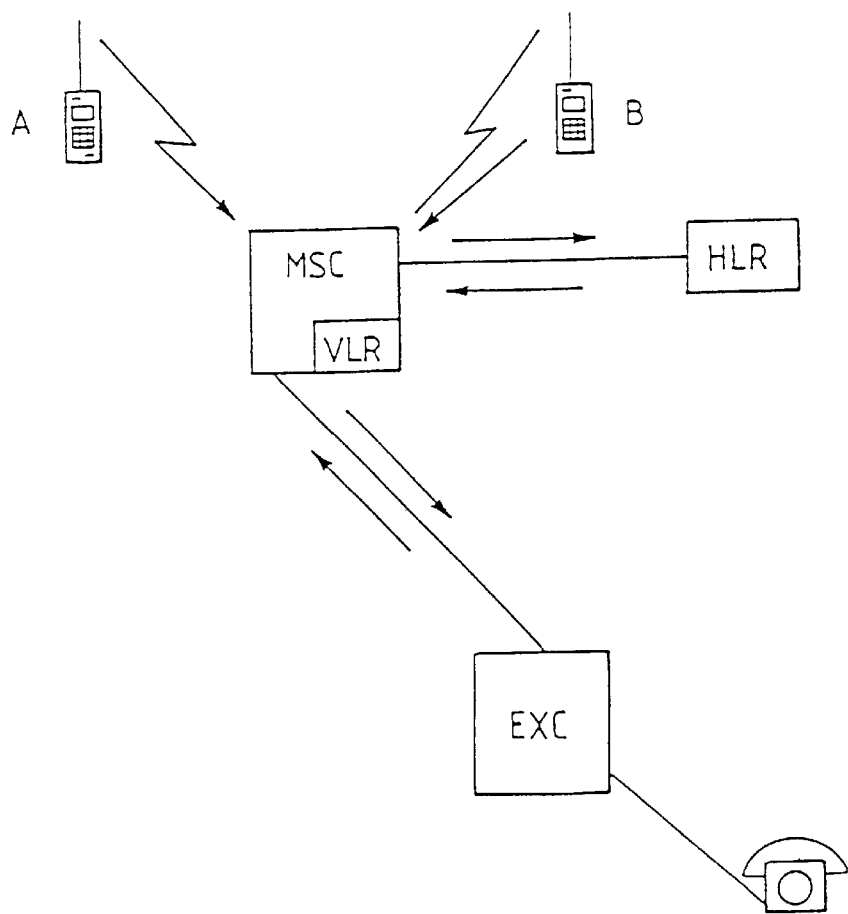
FIG. 4 is a block and signalling diagram illustrating a call set-up event according to the invention.

In the following, the operation of the MSC according to the invention is examined on a network level with reference to FIG. 4. As far as FIG. 4 is concerned, it is assumed that the MSC acts as the serving MSC for mobile subscribers A and B, and simultaneously as the GMSC towards the PSTN. The third subscriber in the call set-up is a PSTN subscriber C, which is coupled to the PSTN exchange EXC. It is assumed that the mobile subscriber A has an activated call forwarding to the PSTN subscriber C, and the subscriber C has an activated call forwarding to the mobile subscriber A. Hence, there exists a situation which would cause an endless call forwarding loop between the exchanges MSC and EXC in a network not conveying the call forwarding information.

Let us assume that a mobile subscriber B places a call to a mobile subscriber A. As the call of the calling subscriber B is received at the MSC (step 1), the MSC requests the routing information of A from the home location register HLR (step 2) which. returns the directory number of the subscriber C as the call forwarding number (step 3). The MSC checks whether the directory number of the subscriber A is already included in the call forwarding database, i.e. whether A already has a call forwarding call in set-up phase. As this is not the case, the directory number of the subscriber A is inserted in the call forwarding database in the MSC (step 4). Following this, the MSC establishes a call to the exchange EXC of the subscriber C (step 5). The exchange EXC detects on the basis of the subscriber database it maintains that the subscriber C has an active call forwarding to the subscriber A (step 6). As a result, the exchange C reestablishes the call to the mobile services switching center MSC (step 7). Upon receiving the call from the exchange C, the MSC does not know that the call is a returning forwarded call, and handles the call in the normal manner. In other words, the MSC requests the routing information of the subscriber A from the HLR (step 8), and the HLR again returns the directory number of the subscriber C as the call forwarding number (step 9). The MSC checks whether the directory number of the subscriber A is already included in the call forwarding database, i.e. whether the subscriber A already has a call forwarding call in set-up phase. As the directory number of the subscriber A has already at an earlier stage (step 4) been inserted in the call forwarding database, the MSC releases the call and thus prevents the development of an endless call forwarding loop.

The figures and their description are only intended to illustrate the present invention. It is obvious for a person skilled in the art that modifications and alterations may be made to the solutions described, without departing from the scope and spirit of the attached claims.

What is claimed is:

1. A mobile services switching center for forwarding a subscriber directory number terminating call to a call forwarding number which is retrieved from a separate subscriber database wherein:

said mobile services switching center comprises a call forwarding database which stores directory numbers of forwarding parties from each of which a set-up of a forwarded call is in progress, the call control of the mobile services switching center is arranged to check, prior to initiating call forwarding, whether a directory number of the forwarding party is included in the call forwarding database, the call control of the mobile services switching center is arranged to release the call in response to the directory number of the forwarding party being included in the call forwarding database, in order to avoid looping of the call due to the call forwarding, and the call control of the mobile services switching center is arranged, in response to the directory number of the forwarding party not being included in the call forwarding database, to insert the directory number of the forwarding party in the call forwarding database, and to continue the call forwarding.

2. A mobile services switching center as claimed in claim 1, wherein the call control of the mobile services switching center is arranged to delete the directory number of the forwarding party from the call forwarding database when the set-up of the forwarded call terminates or is interrupted.

3. A mobile services switching center as claimed in claim 1, wherein a time-out, which the call control of the mobile services switching center activates when the directory number of the forwarding party is provided in the call forwarding database, and which time-out the call control removes when the directory number of the forwarding party is deleted from the call forwarding database.

4. A mobile services switching center as claimed in claim 3, wherein the call control of the mobile services switching center is arranged to delete the directory number of the forwarding party from the call forwarding database in response to the expiration of the time-out associated with it.

5. A mobile services switching center as claimed in claim 1, wherein the mobile services switching center is a gateway mobile services switching center, and the call forwarding number is obtained from the home location register.

6. A mobile services switching center as claimed in claim 1, wherein the mobile services switching center is the center serving the mobile subscriber, and the call forwarding number is obtained from the visitor location register.

7. A mobile services switching center as claimed in claim 1, wherein the mobile services switching center is the switching center of the GSM mobile communication system or a similar system.

8. A mobile services switching center for forwarding a subscriber directory number terminating call to a call forwarding number which is retrieved from a separate subscriber database wherein:

said mobile services switching center comprises a call forwarding database which stores directory numbers of forwarding parties from each of which a set-up of a forwarded call is in progress, the call control of the mobile services switching center is arranged to check, prior to initiating call forwarding, whether a directory number of the forwarding party is included in the call forwarding database, the call control of the mobile services switching center is arranged to release the call in response to the directory number of the forwarding party being included in the call forwarding database, in order to avoid looping of the call due to the call forwarding, the call control of the mobile services switching center is arranged, in response to the directory number of the forwarding party not being included in the call forwarding database, to insert the directory number of the forwarding party in the call forwarding database, and to continue the call forwarding the call control of the mobile services switching center is arranged to delete the directory number of the forwarding party from the call forwarding database when the set-up of the forwarded call terminates or is interrupted a time-out, which the call control of the mobile services switching center activates when the directory number of the forwarding party is provided in the call forwarding database, and which time-out the call control removes when the directory number of the forwarding party is deleted from the call forwarding database, and the call control of the mobile services switching center is arranged to delete the directory number of the forwarding party from the call forwarding database in response to the expiration of the time-out associated with it.

\* \* \* \* \*